United States Patent [19]

Tezuka et al.

[11] 4,114,173
[45] Sep. 12, 1978

[54] PHOTOGRAPHIC CAMERA WITH AN OPERATION MODE DISPLAY DEVICE

[75] Inventors: Nobuo Tezuka, Tokyo; Masanori Uchidoi, Yokohama; Yukio Iura, Yokosuka; Masami Shimizu, Tokyo; Ryoichi Yoshikawa, Yokohama; Hiroshi Aizawa, Kawasaki, all of Japan

[73] Assignee: Canon Kabushiki Kaisha, Tokyo, Japan

[21] Appl. No.: 758,200

[22] Filed: Jan. 10, 1977

[30] Foreign Application Priority Data

Jan. 20, 1976 [JP] Japan .................................. 51-5194

[51] Int. Cl.² .......................... G03B 9/64; G03B 17/00
[52] U.S. Cl. ................................ 354/238; 354/60 L; 354/268; 354/289
[58] Field of Search .............. 354/237, 238, 239, 240, 354/289, 60 E, 60 L, 266, 267, 268

[56] References Cited

U.S. PATENT DOCUMENTS

| | | | |
|---|---|---|---|
| 3,223,013 | 12/1965 | Rentschler | 354/239 |
| 3,667,367 | 6/1972 | Miyagawa | 354/238 |

*Primary Examiner*—Michael L. Gellner
*Attorney, Agent, or Firm*—Toren, McGeady and Stanger

[57] ABSTRACT

A camera having an electrically operated self-timer is provided with an operation mode display device arranged so that when the camera is switched to an exposure control mode by the self-timer, the display being ready for actuation of the timer is rendered recognizable from the object side or to the photographer, while when switched to any other exposure control mode, this display is shielded so as not to be recognizable from the object side or to the photographer.

6 Claims, 9 Drawing Figures

PHOTOGRAPHIC CAMERA WITH AN OPERATION MODE DISPLAY DEVICE

BACKGROUND OF THE INVENTION

1. Field of the Invention

This invention relates to a photographic camera having various exposure control modes which are selectively and electrically operated, and more particularly to a display device for photography by an electrically operating self-timer in such camera.

2. Description of the Prior Art

The conventional photographic camera having a self-timer incorporated therein has been designed to operate in such a manner that the actuation of the self-timer is followed by a certain amount of delay time, at the termination of duration of which the shutter release is automatically effected. In the case of the mechanically operating self-timer, the manually operable charge lever of the self-timer is arranged on the camera housing so that the photographer who usually takes a position on the object side during the exposure operation may be aware of whether or not the shutter release has been effected, as the charge lever returns during the delay time from the set position to the initial one. On the other hand, a camera of the electronic type in which the various control modes are electrically and selectively operated has been designed so that the control for the establishment of such a delay time interval is also electrical as by use of electrical circuit means. In order to make it possible for the photographer to recognize whether or not the duration of the delay time interval is terminated, therefore, the provision for the display of such a terminal time point has been made using a lamp arranged to be either continuously or intermittently energized and positioned so that upon energization of the lamp, the light can be perceived by the photographer, or from the object side. Such a display device is actuated at the time when the self-timer is set, and deactuated at the time either when the shutter starts to open, or when the shutter is closed.

BRIEF SUMMARY OF THE INVENTION

An object of the present invention is to provide a photographic camera having the various operation control modes which are electrically operated in combination with an electric display device therefor.

Another object of the invention is to provide an operation mode display device capable, upon setting the camera to a self-timer-controlled exposure operation mode, of producing a signal which can be viewed either by the photographer or from the side of an object being photographed, and upon setting it out of the same mode, of covering a signalling means of the self-timer out of the view.

Another object of the invention is to provide an operation mode display device constructed as having an inoperative position where the camera shutter is locked from release.

Another object of the invention is to provide an operation mode display device having a number of functions including a function of stopping the camera from further running down to the actuation of the shutter at a desired time, as the camera starts for an exposure operation by the self-timer.

These and other objects, features and advantages of the present invention will become apparent more fully from the following detailed description taken in conjunction with the accompanying drawings in which:

DESCRIPTION OF THE PREFERRED EMBODIMENT

Figure 1:
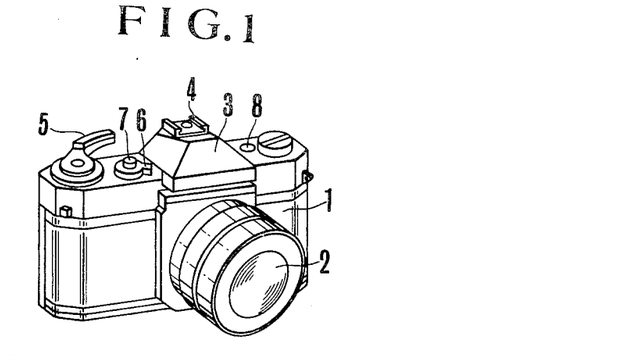
FIG. 1 is a perspective view of a single lens reflex camera embodying the present invention.

Referring to FIG. 1, there is shown a single lens reflex camera having a body 1, an interchangeable objective lens 2, a view-finder housing 3 an accessory shoe 4 provided on the housing 3, a film winding lever 5, a control knob 6 constituting part of an operation mode display device of the invention and which will be described in detail in connection with FIGS. 5 to 8, a shutter button 7 extending through a hole provided along the axis of the control knob 6, and a battery check button 8 which is employed to serve as a camera stop button of the present invention.

Figure 2:
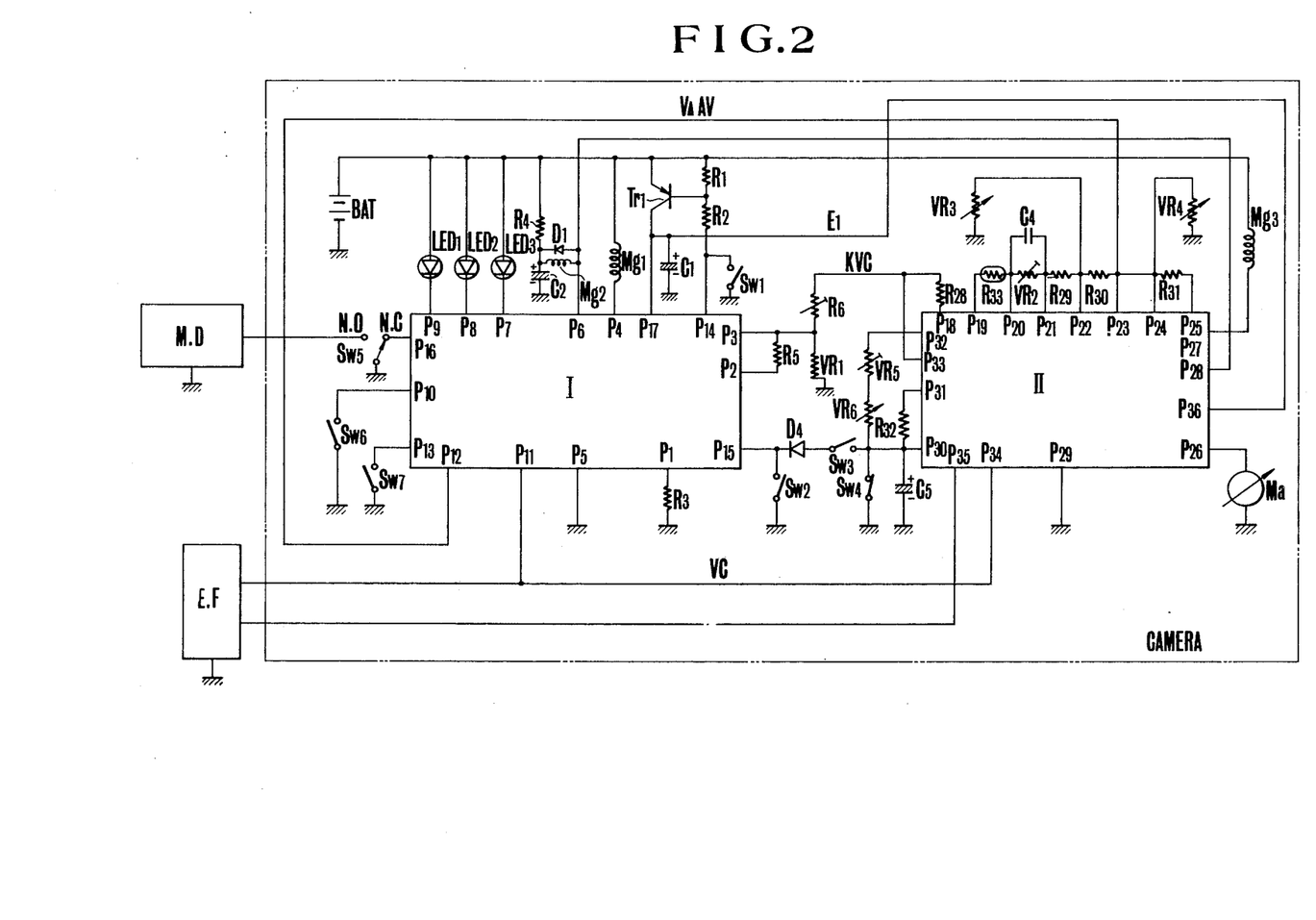
FIG. 2 is a schematic view, partly in block form, of the circuitry of a digital control system for the various electrically operating control modes of the camera of FIG. 1.

FIG. 2 shows the electrical circuitry of the display and control system of the camera of FIG. 1 with that part of the system which is incorporated in the camera body being enclosed by dashed lines and being assumed to be removably associated with a motor drive unit MD and an electronic flash unit EF as necessary. A first block I is an integrated circuit (LSI) including a coordinating control circuit and an automatic diaphragm control circuit with interconnection terminals $P_1$ to $P_{17}$ for the inputs and outputs thereof and for the connection of the externally arranged additional circuit elements. A second block II is an integrated circuit (LSI) including a light measuring circuit, a computing circuit and a shutter time control circuit with interconnection terminals $P_{18}$ to $P_{36}$ for the inputs and outputs thereof and for the connection of the externally arranged additional circuit elements. $Ma$ is an exposure value indicating meter, $Mg_1$, $Mg_2$ and $Mg_3$ are solenoids of electromagnets, $Tr_1$ is a transistor constituting part of a power supply holding circuit, $LED_1$, $LED_2$ and $LED_3$ are light emitting diodes for displaying the conditions of the camera, $VR_1$ to $VR_6$ are variable resistors for setting photographic information and the like, and BAT is an electrical power source or battery.

The block CAMERA of FIG. 2 further includes seven switches $Sw_1$ to $Sw_7$ arranged so that $Sw_1$ is closed when the shutter button is depressed to the first stroke, $Sw_2$ is closed when the shutter button is further depressed to the second stroke, $Sw_3$ is closed when the camera is switched to the bulb exposure mode, $Sw_4$ is opened when the shutter is opened, $Sw_5$ is moved from its "NC" position to its "NO" position when the tailing curtain of the shutter has run down to close the exposure aperture, and from 37 NO" to "NC" position when the film winding lever is cocked, $Sw_6$ is closed when the camera is switched to the manual exposure mode, and $Sw_7$ is closed when the camera is switched to the self-timercontrolled exposure mode. It is to be noted that the block I of FIG. 2 operates in digital form, and the block II in analogue form.

Figure 3:
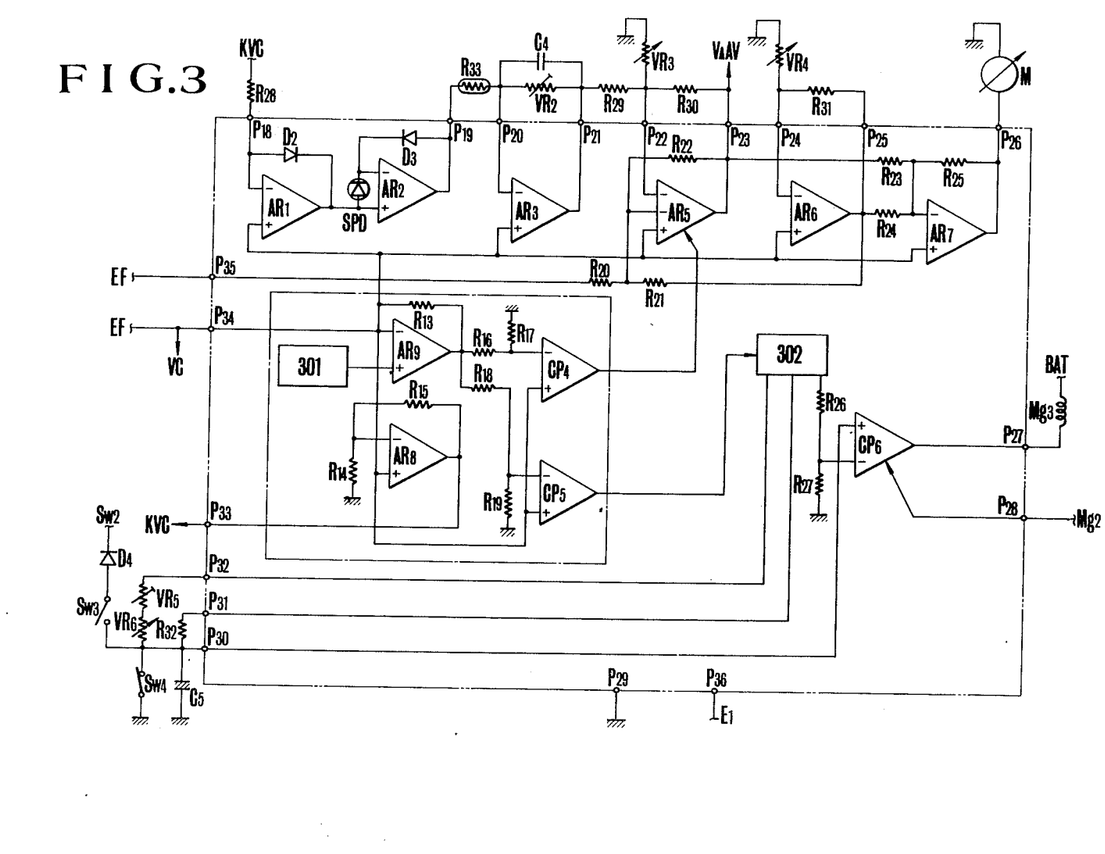
FIG. 3 is a schematic view, partly in block form, of an example of those parts of an exposure control system which are for light measurement, exposure value computation and shutter time control, and which constitute the block II of FIG. 2.

When the shutter release button is depressed to the first stroke, a voltage divider $R_1$, $R_2$ is rendered operative with the battery BAT causing conduction of transistor $Tr_1$ which assures the power supply to the interconnection terminals $P_{36}$ and $P_{29}$ even after the first switch $Sw_1$ is opened and also causing initiation of operation of a photo-voltaic element SPD of FIG. 3, as arranged to receive light from a scene being photographed through the objective lens 2 of FIG. 1. The output current of SPD is amplified by an operational amplifier $AR_2$ with a feedback diode $D_3$ of logarithmic response characteristics to produce an object brightness (BV) information appearing at the interconnection terminal $P_{19}$. In order to compensate for variation with temperature of the characteristics of $D_3$, there is provided a diode $D_2$ having equivalent characteristics to those of $D_3$ and connected between an input terminal of an amplifier $AR_1$ and an output thereof in combination with a posistor $P_{33}$. The posistor $P_{33}$ is arranged outside of the second LSI II and connected between terminals $P_{19}$ and $P_{20}$ for the output of $AR_2$ and an input of an amplifier $AR_3$ respectively. By this amplifier $AR_3$, the high frequency component of the signal of the sensor circuit SPD, $AR_2$, $D_3$ is damped or eliminated, depending upon the characteristics of a capacitor $C_4$ and a variable resistor $VR_2$ connected in parallel to each other and between interconnection terminals $P_{20}$ and $P_{21}$. The output of $AR_3$ is applied through an external resistor $R_{29}$ to a computer circuit comprising an amplifier $AR_5$ and a variable resistor $VR_3$ of which the resistance value is previously adjusted in accordance with a desired shutter speed and the sensitivity of the used film. The output of the computer circuit represents a difference between the proper aperture value and the fully open aperture value available in the objective lens 2. This aperture difference information designated $V\Delta_{AV}$ is directed both to the automatic diaphragm control circuit of the first LSI through $P_{23}$ and $P_{12}$ and to an input stage of the exposure value indicating meter M of which the pointer is arranged to be viewed by the photographer looking through the view-finder of the camera. This input stage includes an external variable resistor $VR_4$ responsive to the fully open F value information (AVO) of the interchangeable objective lens for providing a signal which is combined with the output of the computer circuit by an amplifier $AR_6$ to produce an output representing the proper aperture value (AV).

Upon further depression of the shutter release button to the second stroke, the camera start magnet $Mg_2$ is energized to produce a signal which is applied through interconnection terminal $P_{28}$ to a comparator $CP_6$ of the second LSI with the result that the shutter magnet $Mg_3$ is energized to hold the shutter rear curtain in the cocked position. As the front shutter curtain runs down, switch $Sw_4$ is opened to start the charging of a timing capacitor $C_5$ through series-connected variable resistors $VR_5$ and $VR_6$. When the voltage of capacitor $C_5$ as detected by the comparator $CP_6$ has reached a predetermined level dependent upon the reference voltage supplied from a voltage divider $R_{26}$, $R_{27}$, the comparator $CP_6$ is inverted to produce no output, thereby shutter magnet $Mg_3$ is de-energized causing the rear shutter curtain to run down to terminate the exposure. As the rear curtain is held, $Sw_5$ is set to "NO" position where transistor $Tr_1$ is in the non-conducting state, so that the circuit of FIG. 2 is reset. The second LSI further includes a flash exposure control circuit enclosed by dot-and dash lines arranged to be rendered operative when the flash unit EF is attached to the camera. By this circuit, it is possible to control the size of flash exposure aperture and the flash exposure time in accordance with the camera-to-object distance.

Consideration will next be given to the construction and operation of the digital control system for co-ordinating the various parts of the camera and for automatic adjustment of the diaphragm aperture in connection with FIG. 4.

(1) The camera is assumed to be in the cocked position where $Sw_5$ is set in "NC" position. When the shutter release button 7 is depressed to the first stroke, $Sw_1$ is closed to turn on $Tr_1$ with simultaneous actuation of an oscillator OSC, thereby a train of clock pulses at a frequency depending upon the time constant of a resistor $R_3$ and a capacitor $C_3$ is applied from the oscillator OSC to a binary counter having twenty stages 1 to 20 with respective preset input terminals P and with respective output terminals $\overline{Q_1}$ to $\overline{Q_{20}}$. As the capacitor $C_1$ is charged through $Tr_1$ from a battery E to a voltage at which a transistor $Tr_2$ of a power up clear circuit 303 is turned on with instantaneous conduction of a transistor $Tr_3$ so that the output of circuit 303 becomes instantaneously "0", and the output of a NAND gate 109 becomes instantaneously "1" by which the binary counter is preset. At the same time, a first flip-flop circuit 305 is also preset to the initial state, that is, "1" at $E_2$. A second flip-flop circuit 306 is preset to the initial state, that is, "1" at $E_3$ by the inverted output of the first flip-flop circuit 305, that is, $\overline{E2}$. A third flip-flop circuit 307 is preset by the output of the second one 306 through an inverter 211 to the initial state, that is, "1" at $E_4$. As the two inputs of a NAND gate 121 of a DA-AD converter 308 are of "0", NAND 121 provides an output of "1" which is applied to all the present inputs P of a binary counter having seven stages A to G. The converter 308 further includes an operational amplifier $AR_4$ which is rendered inoperative by $E_2$ of "1", so that a comparator $CP_1$ having an inversion input terminal connected through an external resistor $R_5$ to the output of $AR_4$ produces an output of "1" which maintains the diaphragm electromagnet $Mg_1$ de-energized. It is to be noted that, so long as the shutter release button is depressed to the first stroke after the camera is cocked, each of the $E_1$ to $E_4$ is of "1".

(2) The camera is assumed to be previously set in the manual exposure mode with subsequent establishment of the conditions (1). In this mode, switch $Sw_6$ is closed, causing an inverter 212 to produce an output of "1". When the capacitor $C_1$ is fully charged, transistor $Tr_3$ is turned off again causing the binary counter 1-20 to initiate counting of the clock pulses as all of the inputs of NAND 109 are of "1". When the 13th and 14th output stages $\overline{Q}_{13}$ and $\overline{Q}_{14}$ are set to "1", all of the inputs of NAND 116 become "1", causing energization of the first light-emitting diode LED 1 serving as a display element for the manual exposure mode.

(3) The conditions (1) and (2) remain unchanged, but the light value as sensed by SPD of FIG. 3 has fallen below the specific level. In this case, the voltage representing the aperture difference $V\Delta_{AV}$ is lower than the reference voltage Vc so that a comparator $CP_2$ produces an output of "1" which is applied to a NAND 115. As the other inputs of NAND 115 are of "1", the second light-emitting diode $LED_2$ is energized. $LED_1$ and $LED_2$ are intermittently lighted at a frequency depending upon the period of one cycle of operation of the binary counter 1-20 and may be located within the field of the view-finder.

(4) After the camera has been conditioned as satisfactory in view of the above paragraphs (2) and (3), the shutter release is assumed to proceed from the first stroke to the second one. In this case, switch $Sw_2$ is first closed causing an inverter 202 to produce an output of "1" which is applied to a NAND 107. Assuming further that the voltage of the electrical power source or battery E as detected by a comparator $CP_7$ is sufficiently high, when switch $Sw_5$ is set to the "NC" position causing an inverter 201 to produce an output of "1", the NAND 107 produces an output of "0" which is applied to a NAND 102 of F.F.305, thereby the output $E_2$ is inverted from "1" to "0", and also the output of an inverter 203 is inverted by the output of NAND 102 from "1" to "0", at which the base resistors $R_1$ and $R_2$ of transistor $Tr_1$ are grounded to maintain "on" state of $Tr_1$ regardless of the opening of $Sw_1$. At a time when an output of "0" appears at $E_2$, a one-shot circuit 304 which is connected through an inverter 204 to the F.F.305 starts to produce an output of "0" by which the binary counter 1-20 is preset again. After the duration of a delay time dependent upon inverters 205 to 207 is terminated, the NAND 109 is inverted from "1" to "0", at which the binary counter 1-20 starts to count the clock pulses.

The inversion of $E_2$ to "0" also causes release of operation of $AR_4$ which in turn causes inversion of $CP_1$ as the output of $AR_4$ corresponds to the set state of counter A-G so that the potential of the inversion input terminal of $CP_1$ becomes high causing energization of the diaphragm electromagnet $Mg_1$. At this time, a signal of "1" appears at each of those input terminals of a NAND 120 which are connected to $\overline{E}_2$ and to the output terminals of a NAND 119 and a comparator $CP_3$, so that the output $\overline{Q}_1$ is passed through NAND 120 to the counter A-G.

(5) The camera is alternatively assumed to be set in the automatic exposure mode before the shutter release. In this case, $Sw_6$ is open causing de-energization of the first display element $LED_1$ and also causing NAND 121 to produce "0" output at the time of the second shutter release stroke at which the counter A-G starts to count the pulsated output $\overline{Q}_1$. As the number of pulses $\overline{Q}_1$ counted is increased, the output of the operational amplifier $AR_4$ is correspondingly decreased step by step to a final level dependent upon the input of comparator $CP_3$ at which a signal $V\Delta_{AV}$ appears, as the output of comparator $CP_3$ is applied to the NAND 120 to terminate the counting operation. As a result, the analogue information from the light measuring circuit is stored in the counter A-G in the digital form. An advantage deriving from the design of controlling operation of $CP_3$ by the output of NAND 120 is that the counting is not affected by noise.

As switch $Sw_7$ is open because of no actuation of the self-timer, an inverter 208 produces "0" output which is then applied directly to a NAND 110 and through an inverter 209 to a NAND 111. Upon simultaneous occurrence of outputs $\overline{Q}_8$, $\overline{Q}_9$ and $\overline{Q}_{10}$ for "1", the output of NAND 111 is inverted from "1" to "0" and then the output $E_3$ of F.F.306 is inverted from "1" to "0". Upon advent of $\overline{E}_3$ on NAND 118 before the simultaneous occurrence of outputs $\overline{Q}_7$ and $\overline{Q}_9$ for "1", electromagnet $Mg_2$ is energized to start the automatic adjustment of a diaphragm mechanism not shown to the aperture value digitally stored in counter A-G, as a variable resistor $VR_1$ is moved during the diaphragm scanning process, where output of $VR_1$ is compared with reference voltage VC by $CP_1$ to control the period of actuation of diaphragm electromagnet $Mg_1$. At the same time of energization of camera start electromagnet $Mg_2$, the shutter electromagnet $Mg_3$ is energized to hold the shutter rear curtain in the cocked position. Upon simultaneous occurrence of outputs $\overline{Q}_7$ and $\overline{Q}_9$ for "1", the camera start electromagnet $Mg_2$ is de-energized and the output of F.F.307 is inverted from "1" to "0", thereby the counter 1-20 is reset.

As the shutter front cutain runs down to open $Sw_4$, the timing capacitor $C_5$ is charged through the timing resistors $VR_5$ and $VR_6$ to a voltage dependent upon the preselected shutter speed and at which $CP_6$ is inverted to de-energize shutter electromagnet $Mg_3$. When the rear curtain has run down, switch $Sw_5$ is moved from "NC" to "NO" position where a motor of unit MD of FIG. 2 is energized to drive the film transporting system of the camera. Now assuming that SINGLE FRAME operation is intended, the movement of $Sw_5$ away from "NC" position causes non-conduction of the power supply control transistor $Tr_1$ because of the production of "0" output of inverter 201 followed by "1" output of F.F.305 followed by "1" output of inverter 203.

When a continuous succession of frames is to be exposed by use of the motor drive unit MD, the operator needs to continue the depression of the shutter release button by which $Sw_1$ and $Sw_2$ are closed. In this case, the movement of $Sw_5$ from "NC" to "NO" position causes inversion of $E_2$ to "1" which in turn causes inversion of $E_3$ to "1" and then of $E_4$ to "1" and then of the output of NAND 109 to "0", thereby the counter 1-20 is made to start the counting. In this situation, the power supply from BAT is maintained effective by having $Tr_1$ conducted because of the closure of $Sw_1$ and $Sw_2$ with "1" output of inverter 202. Therefore, at the time of completion of one cycle of film winding operation, $Sw_5$ is turned to "NC" position where inverter 210 produces "1" output, and F.F.305 produces "0" output. Because of $\overline{E}_2$ inverted to "1", the one-shot circuit 304 is instantaneously rendered to produce "0" output so that the same sequential operation as the above occurs to start the camera.

(6) When the self-timer is to be used, the operator will throw switch $Sw_7$ causing the inverter 208 to produce "1" output which is applied to a NAND 117 controlling operation of the third display element $LED_3$ for the self-timer-controlled exposure mode. After a short time interval from the shutter release, the simultaneous occurrence of "1" outputs at $\overline{Q}_{14}$ and $\overline{Q}_{15}$ is resulted to start energization of $LED_3$ so that the photographer may be aware of the fact that the camera is made ready for photography by the self-timer. The energization of LED$_3$ continues until the simultaneous occurrence of "1" outputs at $\overline{Q}_{19}$ and $\overline{Q}_{20}$. At this time, the output of NAND 110 is inverted from "1" to "0" causing an inverter 213 to produce "0" output. As E$_2$ is "0" because of the second stroke, F.F.306 is inverted to produce "0" output E$_3$ which is applied to a NAND 113 to produce "0" output with the simultaneous production of "1" output from NAND 109, thereby the counter 1-20 is preset. Soon after this time, the output of NAND 109 becomes "0" causing the start of the counting. The subsequent operation proceeds in the same manner as that described in connection with paragraph (5). It is to be noted that when the shutter release button is depressed to the second stroke, the first and second display elements LED$_1$ and LED$_2$ are de-energized.

Figure 4:
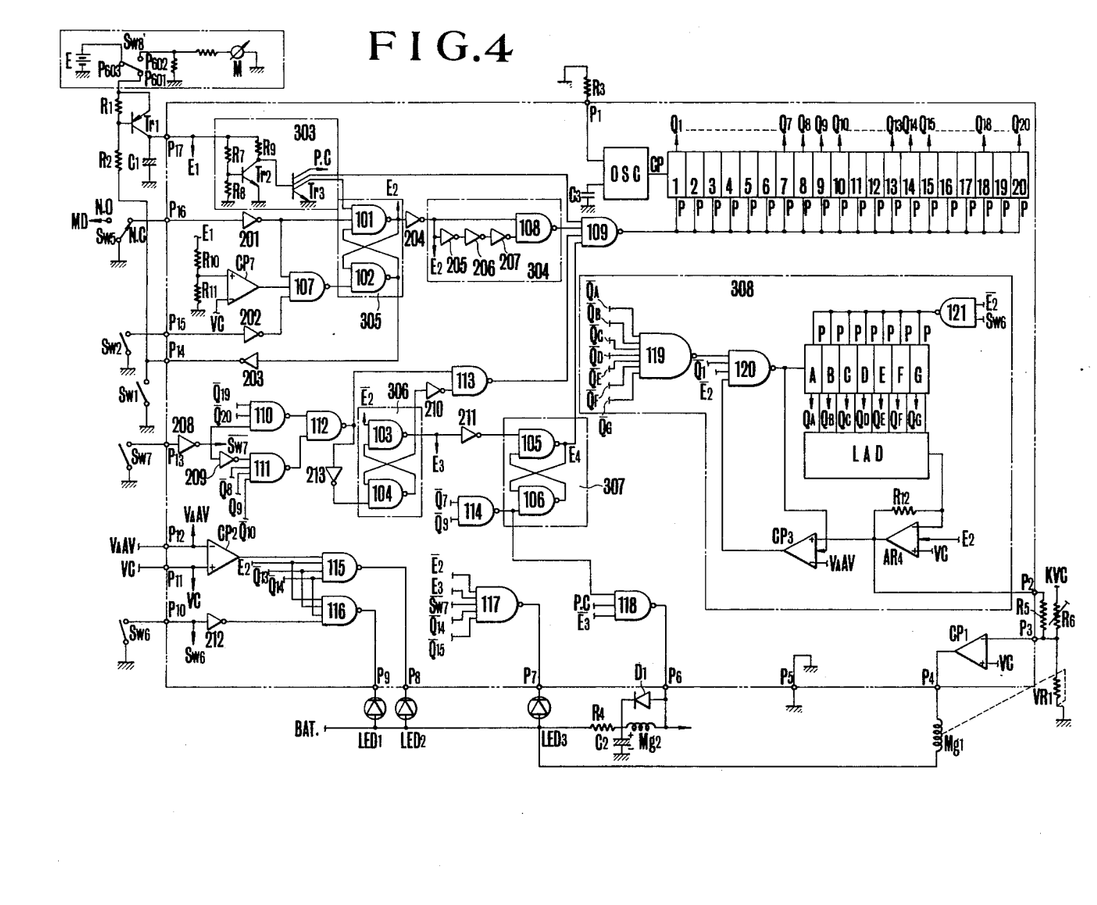
FIG. 4 is a schematic view, partly in block form, of an example of the combination of a co-ordinating system and that part of the exposure control system which is for diaphragm control, these systems constituting the block I of FIG. 2.

If the photographer desires to stop the camera during the self-timer operation, he only needs to push a battery check button 8 of FIG. 1, thereby switch Sw$_8$ of FIG. 4 is set from "P603" position to "P602" position where the circuit is reset. If he desires to start the camera again, he removes this finger from the button 8 and then depresses the shutter button 7, thereupon the power up clear circuit 303 is rendered operative.

Figures 5, 9:
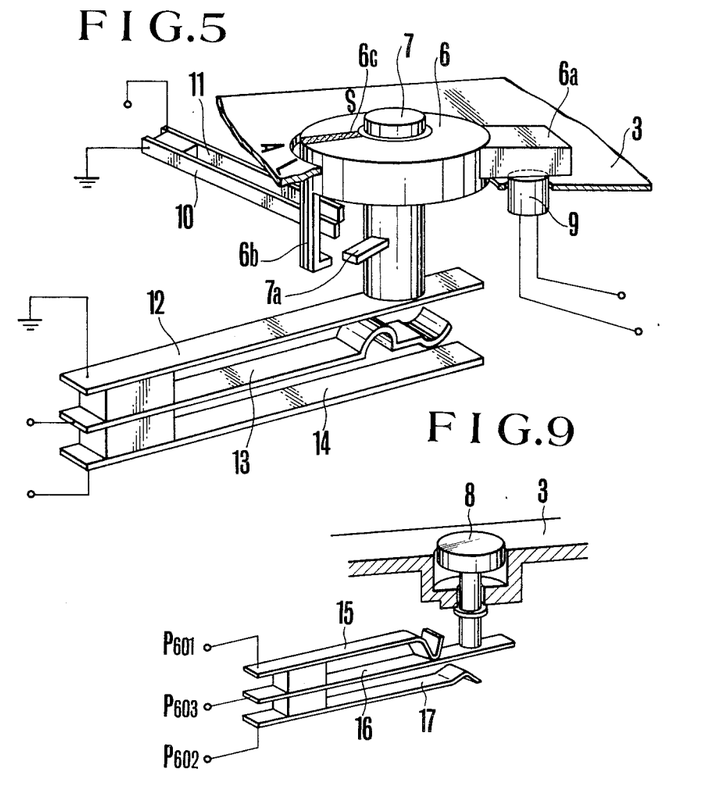
FIG. 5 is a perspective view on an enlarged scale of one embodiment of the operation mode display device according to the present invention employed in the camera of FIG. 1.
FIG. 9 is a perspective view of a battery check button associated with a switch constituting part of the display device of FIGS. 5 to 8.
Figure 6:
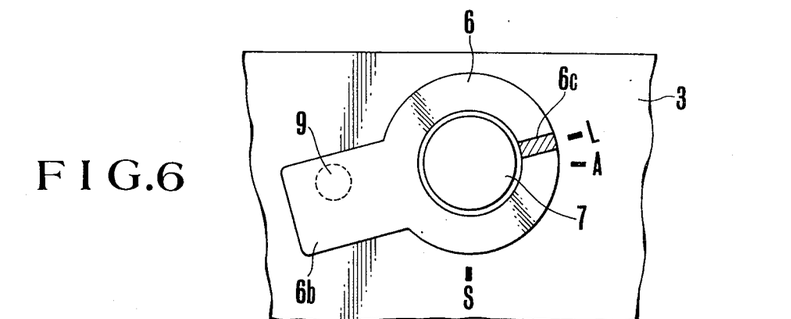
FIGS. 6, 7 and 8 are top views on an enlarged scale of the display device of FIG. 5 in respective different operative positions.
Figure 7:
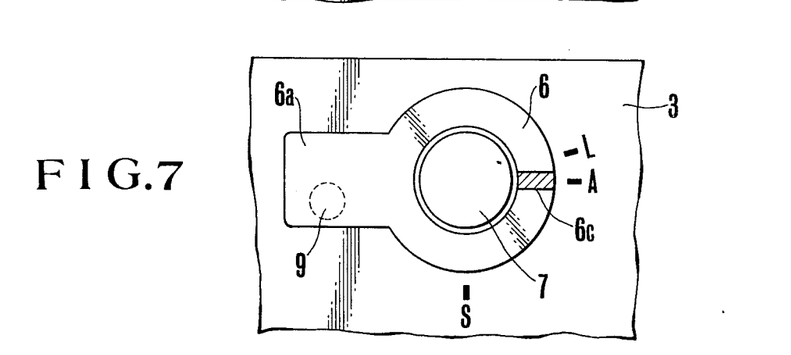
Figure 8:
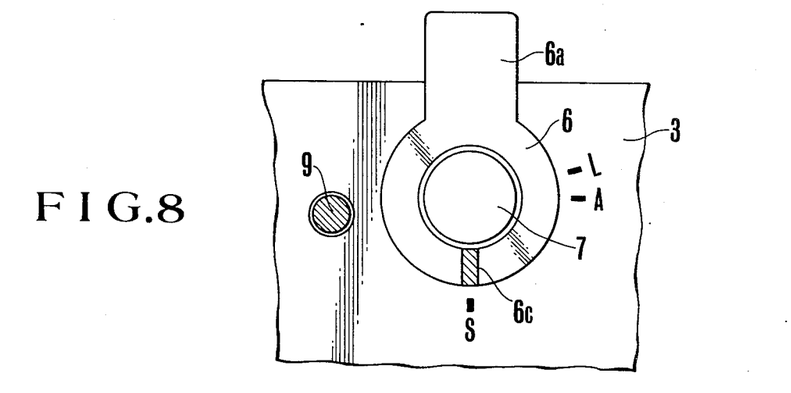

FIG. 5 shows one embodiment of an actuating member of the display device of FIGS. 2 to 4 according to the present invention as associated with the shutter release button, wherein the same reference characters have been employed to denote the similar parts to those shown in FIG. 1. This actuating member is constructed in the form of a rotary switchable knob 6 which is accessible to the operator from the outside of the camera housing and rotatable about a shaft of the shutter button 7 to be set with its index mark 6c in any of the switched positions L (the release 7 locked on), A (manual actuation of the release 7) and S (self-timer with manual actuation of the release 7) as will be seen more clearly in FIGS. 6, 7 and 8 respectively. The knob 6 has a projection 6a radially extending to overlap a light-emitting surface of the self-timer exposure mode display element 9 or diode LED$_3$ of FIG. 2 and having a width large enough to shield the light of LED$_3$ from the photographer's view when the knob 6 is set in either of the positions L and A as shown in FIGS. 6 and 7 but small enough to permit the photographer to view the light of LED$_3$ when the knob 6 is set in the position S, as shown in FIG. 8.

Referring again to FIG. 5, the knob 6 is provided with a downwardly extending arm 6b having a bent-off portion arranged so that when in "L" position a post 7a extending radially from the release shaft abuts against it, while when in "A" position the bent-off portion of the arm 6b is moved away from the post 7a to permit manual actuation of the shutter release button 7 for closure of an assembly of switch elements Sw$_1$ and Sw$_2$ successively. This switch assembly is constructed from three contacts 12, 13 and 14, with the contacts 12 and 13 constituting switch Sw$_1$ and with the contacts 13 and 14 constituting switch Sw$_2$.

The switch Sw$_7$ of FIGS. 2 and 4 controlling actuation of the diode 9 at the time of the shutter release is constructed from two contacts 10 and 11 and arranged to be closed when the knob 6 is set to the position S by abutting engagement of contact 10 with the arm 6b.

FIG. 9 shows an example of modification of an actuator of a battery checking device to serve as a stop button for the self-timer. The button 8 is movably mounted in a recessed portion of the camera housing 3 and arranged to cooperate with the switch Sw$_8$ of FIG. 2 and 4. The switch Sw$_8$ is shown as constructed from three contacts 15, 16 and 17 with the intermediate contact 16 extending into the path of movement of the shaft of the button 8 so that when the button is depressed, the intermediate contact 16 is taken out of contact with the contact 15 but brought into contact with the contact 17. These contacts 15, 16 and 17 are connected by way of respective leads to the interconnection terminals P601, P602 and P603 of FIG. 4 respectively.

What is claimed is:

1. A photographic camera having a mode display device comprising:
   a. an electric self-timer means;
   b. a shutter button for operating a shutter release;
   c. a self-timer operation mode display means visually recognizable from outside of the camera, said means being electrically connected to the electric self-timer means; and
   d. a shielding means, said means being rotatably coaxial with the shutter button and movable between the one position at which the self-timer operation mode display means is visually recognizable and the other position at which the self-timer operation mode display means is not visually recognizable.

2. A photographic camera according to claim 1 further comprising:
   a. a self-timer switching means, said means being electrically connected to the electrical self-timer means and initiating the electrical self-timer means into an operation preparation mode by changing over the shielding means into the position at which the mode display is visually recognizable.

3. A photographic camera according to claim 2, wherein the self-timer switching means is closed by means of a member projecting from the shielding means.

4. A photographic camera according to claim 1, wherein the self-timer operation mode display means is a light emitting diode.

5. A photographic camera according to claim 1, further comprising:
   a shutter release operation prohibiting means;
   a. a projection member provided on the release button;
   b. an engaging member, said member being integral with the shielding means and movable along with the rotation of the shielding means into a position at which said member is engageable with the projection member so as to lock the shutter release operation.

6. A mode display means for a camera having:
   a. an electrical self-timer means;
   b. a shutter button for shutter release operation;
   c. a self-timer switching means, said means being connected to the electrical self-timer means and initiating the self-timer means into the operation preparation mode; comprising:
   A. a self-timer operation mode display means, said means being electrically connected to the electrical self-timer means and the self-timer switching means and arranged so as to be visually recognizable from outside of the camera;
   B. a shielding means, said means being rotatably coaxial with the shutter button, movable between the one position at which the mode display means is visually recognizable and the other position at which the mode display means is not visually recognizable and having a member for closing the self-timer switching means in operative engagement with the change over operation;

C. a shutter release operation prohibiting means, said means including a projecting member provided on the shutter button and an engaging member constituted as one body with the shielding means so as to be engageable with the projecting member in order to lock the shutter release by means of the release button.

* * * * *